(12) United States Patent
Takahara

(10) Patent No.: US 9,676,152 B2
(45) Date of Patent: Jun. 13, 2017

(54) TIRE PUNCTURE SEALING AGENT

(71) Applicant: THE YOKOHAMA RUBBER CO., LTD., Minato-Ku, Tokyo (JP)

(72) Inventor: Hideyuki Takahara, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 15/122,481

(22) PCT Filed: Mar. 4, 2015

(86) PCT No.: PCT/JP2015/056346
§ 371 (c)(1),
(2) Date: Aug. 30, 2016

(87) PCT Pub. No.: WO2015/133519
PCT Pub. Date: Sep. 11, 2015

(65) Prior Publication Data
US 2017/0066206 A1    Mar. 9, 2017

(30) Foreign Application Priority Data

Mar. 5, 2014  (JP) ................................. 2014-042308
Mar. 5, 2014  (JP) ................................. 2014-042309

(51) Int. Cl.
| | | |
|---|---|---|
| *B29C 73/16* | (2006.01) | |
| *C09J 9/00* | (2006.01) | |
| *C09J 11/06* | (2006.01) | |
| *C09J 107/02* | (2006.01) | |
| *C09J 123/08* | (2006.01) | |

(52) U.S. Cl.
CPC ............... *B29C 73/163* (2013.01); *C09J 9/00* (2013.01); *C09J 11/06* (2013.01); *C09J 107/02* (2013.01); *C09J 123/0853* (2013.01)

(58) Field of Classification Search
CPC ................................ B29C 73/16; C09J 107/02
USPC .......................................... 523/166; 524/376
See application file for complete search history.

(56) References Cited

U.S. PATENT DOCUMENTS

| | | |
|---|---|---|
| 2011/0086944 A1 | 4/2011 | Schunack et al. |
| 2011/0201722 A1 | 8/2011 | Takahara et al. |
| 2013/0172465 A1 | 7/2013 | Okamatsu et al. |
| 2014/0221527 A1 | 8/2014 | Naruse |
| 2015/0337155 A1 | 11/2015 | Ichikawa |

FOREIGN PATENT DOCUMENTS

| | | |
|---|---|---|
| JP | 2011-012158 A | 1/2011 |
| JP | 2011-026544 A | 2/2011 |
| JP | 2011-512429 A | 4/2011 |
| JP | 2013-040297 A | 2/2013 |
| WO | 2011/148853 A1 | 12/2011 |
| WO | 2014/003028 A1 | 1/2014 |

*Primary Examiner* — Edward Cain
(74) *Attorney, Agent, or Firm* — Carrier Blackman & Associates, P.C.; Joseph P. Carrier; William D. Blackman

(57) ABSTRACT

An object of the present invention is to provide a tire puncture sealing agent that has excellent freeze resistance and that also exhibits excellent sealing properties even in a small liquid amount. The tire puncture sealing agent of the present invention contains: a rubber latex and/or a resin emulsion; a glycol ether represented by Formula (1) below; and a surfactant. In Formula (1), $R_{11}$ represents a hydrogen atom or an alkyl group. $R_{12}$ represents an alkyl group. p represents an integer of 1 or greater.

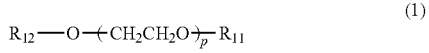

(1)

8 Claims, No Drawings

TIRE PUNCTURE SEALING AGENT

TECHNICAL FIELD

The present invention relates to a tire puncture sealing agent.

BACKGROUND ART

In recent years, there has been an increase in instances where a puncture repair kit is introduced as standard equipment or optional equipment in an automobile.

Puncture repair kits having a combination of a tire puncture sealing agent (tire puncture sealing material) and an optional compressor and the like have been known. As actual products, compact packages that combine the tire puncture sealing agent, known as an "emergency tire puncture repairing agent" or the like, a low capacity compressor that draws power via a cigarette lighter socket, and the like are generally known.

The tire puncture sealing agents are required to be hard to freeze even at low temperatures (required to have freeze resistance) so that the tire puncture sealing agents can be used in a cold region.

In such circumstances, for example, Patent Document 1 discloses "a tire puncture sealing agent containing a natural rubber latex and/or a synthetic resin emulsion, and propylene glycol, the ratio of propylene glycol to water being from 0.5 to 1.1, and the viscosity at $-20°$ C. when a BL-type viscometer is used being from 100 to 1,200 mPa·s at a revolution speed of 60 rpm" (claim 1). Furthermore, Patent Document 2 discloses "a tire puncture sealant containing a natural rubber latex, an adhesion-imparting agent, 1,3-propanediol, and a nonionic surfactant" (claim 1).

Patent Documents 1 and 2 describe that excellent injectability at low temperatures can be achieved by the compositions described above.

CITATION LIST

Patent Literature

Patent Document 1: Japanese Unexamined Patent Application Publication No. 2013-40297A
Patent Document 2: Japanese Unexamined Patent Application Publication No. 2011-12158A

SUMMARY OF INVENTION

Technical Problem

Meanwhile, along with demands to make puncture repair kits smaller or the like, the liquid amounts of tire puncture sealing agents need to be reduced (e.g. reduction to approximately ⅔ of the conventional amount).

When the inventor of the present invention investigated the tire puncture sealing agents disclosed in Patent Documents 1 and 2, although it was confirmed that the tire puncture sealing agents have excellent freeze resistance, the sealing properties are not always satisfactory when the tire puncture sealing agent is used in the liquid amount that is less than the conventional amount (liquid amount of approximately ⅔ of the conventional amount).

Therefore, in light of the circumstances described above, an object of the present invention is to provide a tire puncture sealing agent that has excellent freeze resistance and that also exhibits excellent sealing properties even in a small liquid amount.

Summary of Invention

As a result of diligent research on the above problem, the inventor of the present invention has found that blending of a particular glycol ether leads to excellent freeze resistance, and excellent sealing properties even in a small liquid amount, and thus completed the present invention.

Specifically, the inventor discovered that the problems described above can be solved by the following features.

(1) A tire puncture sealing agent containing: a rubber latex and/or a resin emulsion; a glycol ether represented by Formula (1) described below; and a surfactant.

(2) The tire puncture sealing agent according to (1) above, where a content of the glycol ether is from 70 to 300 parts by mass per 100 parts by mass total of a solid content of the rubber latex and a solid content of the resin emulsion.

(3) The tire puncture sealing agent according to (1) or (2) above, where the surfactant is a sulfate ester salt.

(4) The tire puncture sealing agent according to any one of (1) to (3) above, where a content of the surfactant is from 3 to 20 parts by mass per 100 parts by mass total of a solid content of the rubber latex and a solid content of the resin emulsion.

(5) The tire puncture sealing agent according to any one of (1) to (4) above, where p in Formula (1) described below is an integer of 3 or greater.

Advantageous Effects of Invention

As described below, the present invention can provide a tire puncture sealing agent that has excellent freeze resistance and that also exhibits excellent sealing properties even in a small liquid amount.

DESCRIPTION OF EMBODIMENT

The tire puncture sealing agent of the present invention will be described below. In this specification, a numerical range represented using "(from) . . . to . . . " refers to a range including the numerical values stated before and after the ". . . to . . . " as a lower limit value and an upper limit value.

The tire puncture sealing agent of the present invention contains: a rubber latex and/or a resin emulsion; a glycol ether represented by Formula (1) described below; and a surfactant.

It is conceived that the tire puncture sealing agent of the present invention has excellent freeze resistance and exhibits excellent sealing properties even in a small liquid amount since the tire puncture sealing agent has such a composition. Although the reason is not clear, it is assumed to be as follows.

In tire puncture repair using a tire puncture sealing agent, the tire puncture sealing agent is injected into a punctured tire, and the pneumatic tire is used to travel in that condition. At this time, the tire puncture sealing agent is shaken within the tire, and as a result, the solid content of the tire puncture sealing agent is deposited to cover the puncture hole.

The inventor of the present invention has observed that, when the viscosity of the tire puncture sealing agent is low, the tire puncture sealing agent rapidly fills the puncture hole, and it is possible to maintain the sealing properties even when the liquid amount is reduced. Furthermore, it is also observed that the viscosity of a tire puncture sealing agent is lowered by blending a glycol ether represented by Formula (1) described below (particular glycol ether).

The present invention is based on these observations, and it is conceived that the viscosity of a tire puncture sealing agent is lowered by blending the particular glycol ether described above, thereby achieving excellent sealing properties even in a small liquid amount. Furthermore, since the particular glycol ether has a low freezing point, it is conceived that the tire puncture sealing agent of the present invention also has excellent freeze resistance.

Note that the tire puncture sealing agent of the present invention has excellent injectability due to the low viscosity described above.

Furthermore, it is also conceived that excellent sealing properties can be achieved from the following reasons.

That is, the tire puncture sealing agent injected into a tire may foam due to the shaking during traveling. The inventor of the present invention has observed that, when the tire puncture sealing agent foams in such a manner, the apparent volume of the injected tire puncture sealing agent is increased, and the sealing properties are maintained even when the liquid amount is reduced. Furthermore, it is also observed that the tire puncture sealing agent in which the glycol ether represented by Formula (1) described below (particular glycol ether) is blended exhibits high initial foaming and maintains the foam even after some time has passed.

Therefore, it is conceived that the apparent volume of the injected tire puncture sealing agent is increased and thus excellent sealing properties can be achieved even in a small liquid amount by blending the particular glycol ether.

Each component contained in the tire puncture sealing agent of the present invention will be described below.

Rubber Latex and/or Resin Emulsion

The tire puncture sealing agent of the present invention contains a rubber latex and/or a resin emulsion. In particular, the tire puncture sealing agent preferably contains a rubber latex and a resin emulsion. That is, a combined use of a rubber latex and a resin emulsion is preferable.

The rubber latex and the resin emulsion will be described below.

Rubber Latex

The rubber latex described above is not particularly limited, and a conventionally known rubber latex can be used.

Specific examples of the rubber latex include natural rubber latex, chloroprene latex, styrene butadiene rubber latex, acrylonitrile butadiene rubber latex, and styrene butadiene acrylic rubber latex. Among these, natural rubber latex is preferable.

A single type of rubber latex or a combination of two or more types of rubber latexes can be used in the tire puncture sealing agent of the present invention.

The natural rubber latex described above is not particularly limited, and a conventionally known natural rubber latex can be used.

Specific examples of the natural rubber latex include material sampled from *Hevea brasiliensis* by tapping, so-called "deproteinized natural rubber latex" which is protein-free natural rubber latex.

The content of the solid content in the rubber latex is not particularly limited; however, the content is preferably from 40 to 80 mass % relative to the total amount of the rubber latex.

Resin Emulsion

The resin emulsion is not particularly limited, and a conventionally known resin emulsion can be used. Of these, a synthetic resin emulsion is preferable.

Specific examples of the synthetic resin emulsion include urethane emulsions, acrylic emulsions, polyolefin emulsions, ethylene-vinyl acetate copolymer emulsions, polyvinyl acetate emulsions, ethylene-vinyl acetate-vinyl versatate copolymer emulsions, and polyvinyl chloride emulsions. One type of these may be used alone, or two or more types of these may be used in combination.

As the resin emulsion, ethylene-vinyl acetate copolymer emulsions or ethylene-vinyl acetate-vinyl versatate copolymer emulsions are preferred, and ethylene-vinyl acetate-vinyl versatate copolymer emulsions are more preferred.

The content of the solid content in the resin emulsion is not particularly limited; however, the content is preferably from 30 to 70 mass % relative to the total amount of the resin emulsion.

In the tire puncture sealing agent of the present invention, the total content of the rubber latex and the resin emulsion is not particularly limited; however, the content is preferably from 30 to 80 mass % relative to the total amount of the tire puncture sealing agent.

Furthermore, the total content of the solid content of the rubber latex and the solid content of the resin emulsion is not particularly limited; however, the content is preferably from 10 to 50 mass % relative to the total amount of the tire puncture sealing agent.

Glycol Ether

The tire puncture sealing agent of the present invention contains a glycol ether represented by Formula (1) below.

[Chemical Formula 1]

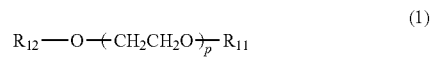

$$R_{12}-O-(CH_2CH_2O)_p-R_{11} \quad (1)$$

In Formula (1) above, $R_{11}$ represents a hydrogen atom or an alkyl group. In particular, $R_{11}$ is preferably a hydrogen atom. The alkyl group is not particularly limited; however, the alkyl group is preferably an alkyl group having from 1 to 10 carbons. Although the alkyl group may be a straight-chain, branched-chain, or cyclic alkyl group, the alkyl group is preferably a straight-chain alkyl group.

In Formula (1) above, $R_{12}$ represents an alkyl group. In particular, $R_{12}$ is preferably an alkyl group having from 1 to 10 carbons, more preferably an alkyl group having 2 or more carbons, even more preferably an alkyl group having 3 or more carbons, and particularly preferably an alkyl group having 4 or more carbons. Although the alkyl group may be a straight-chain, branched-chain, or cyclic alkyl group, the alkyl group is preferably a straight-chain alkyl group.

In Formula (1), p is an integer of 1 or greater. In particular, p is preferably an integer of 2 or greater, and more preferably an integer of 3 or greater.

Specific examples of the glycol ether include methyl glycol, methyl diglycol, methyl triglycol, methyl polyglycol, dimethyl glycol, dimethyl diglycol, dimethyl triglycol, dimethyl polyglycol, ethyl glycol, propyl glycol, butyl glycol, octyl glycol, butyl diglycol, butyl triglycol, butyl polyglycol, dibutyl glycol, dibutyl diglycol, dibutyl triglycol, and dibutyl polyglycol.

The content of the glycol ether is not particularly limited in the tire puncture sealing agent of the present invention;

however, the content is preferably from 10 to 500 parts by mass, more preferably from 50 to 300 parts by mass, even more preferably from 70 to 300 parts by mass, and particularly preferably from 100 to 300 parts by mass, per 100 parts by mass total of the solid content of the rubber latex and the solid content of the resin emulsion.

Surfactant

The surfactant contained in the tire puncture sealing agent of the present invention is not particularly limited, and a conventionally known surfactant can be used. Specific examples of the surfactant include nonionic surfactants, anionic surfactants, cationic surfactants, and amphoteric surfactants. One type of these surfactants may be used alone, or two or more types of these surfactants may be used in combination.

Examples of the nonionic surfactant include sorbitan fatty acid esters, polyoxyethylene sorbitan fatty acid esters, polyoxyethylene higher alcohol ethers, polyoxyethylene-propylene higher alcohol ethers, polyoxyethylene fatty acid esters, polyoxyethylene alkylphenols, polyoxyethylene alkylamines, and polyoxyethylene-polyoxypropylene block polymers.

Examples of the anionic surfactant include fatty acid salts, alkyl sulfates, alkyl ether sulfates, alkyl ester carboxylates, alkylbenzene sulfonates, straight-chain alkylbenzene sulfonates, alpha-sulfofatty acid ester salts, alkyl polyoxyethylene sulfates, alkyl phosphates, monoalkyl phosphates, naphthalene sulfonates, alpha-olefin sulfonates, alkane sulfonates, and alkenyl succinates.

Examples of the cationic surfactant include alkylamine acetates, and quaternary ammonium salts, such as alkyltrimethylammonium chlorides.

Examples of the amphoteric surfactants include alkyl dimethyl betaine, and alkyl amide betaine.

The surfactant is preferably at least one type of surfactant selected from the group consisting of nonionic surfactants and anionic surfactants, more preferably anionic surfactants, and even more preferably sulfate ester salts.

The sulfate ester salt is not particularly limited; however, the sulfate ester salt is preferably an alkyl sulfate or a polyoxyethylene alkyl ether sulfate, and more preferably a compound represented by Formula (2) or (3) below.

[Chemical Formula 2]

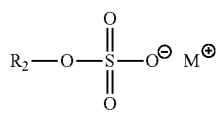

(2)

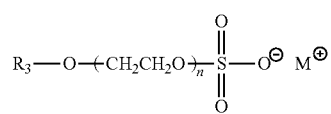

(3)

In Formulas (2) and (3) above, $R_2$ and $R_3$ each independently represent an alkyl group having from 1 to 20 carbons, $M^+$ represents a monovalent cation, and n represents an integer of 1 to 15.

In Formulas (2) and (3) above, examples of an alkyl group having from 1 to 20 carbons represented by $R_2$ and $R_3$ include a methyl group, ethyl group, propyl group, butyl group, pentyl group, hexyl group, heptyl group, octyl group, ethylhexyl group, nonyl group, decyl group, dodecyl group (lauryl group), undecyl group, hexadecyl group, octadecyl group, cyclopropylmethyl group, and trifluoroethyl group. Among these, a long-chain alkyl group having from 10 to 20 carbons is preferable. Although the alkyl group may be a straight-chain, branched-chain, or cyclic alkyl group, the alkyl group is preferably a straight-chain alkyl group.

Examples of the monovalent cation represented by $M^+$ in Formulas (2) and (3) include monovalent metal cations (e.g. cations of alkali metals), and ammonium cations. Among these, a cation represented by Formula (4) below is preferable.

[Chemical Formula 3]

(4)

In Formula (4) above, $R_{41}$ to $R_{44}$ each independently represent a hydrogen atom, alkyl group (e.g. alkyl group having from 1 to 5 carbons), or an alkyl group having a hydroxy group (e.g. —R—OH; note that R represents an alkylene group (preferably an alkylene group having from 1 to 5 carbons)). At least one of $R_{41}$ to $R_{44}$ is preferably an alkyl group having a hydroxy group.

Examples of the cation represented by Formula (4) include triethanol ammonium.

The content of the surfactant is not particularly limited in the tire puncture sealing agent of the present invention; however, the content is preferably from 0.1 to 30 parts by mass, more preferably from 1 to 20 parts by mass, and even more preferably from 3 to 20 parts by mass, per 100 parts by mass total of the solid content of the rubber latex and the solid content of the resin emulsion.

Optional Component

The tire puncture sealing agent of the present invention may contain, as necessary, another component (optional component) other than the components described above. Examples of the optional component include antifreeze agents, fillers, antiaging agents, antioxidants, pigments (dyes), plasticizers, thixotropic agents, UV absorbents, flame retardants, dispersants, dewatering agents, and antistatic agents.

Method of Producing Tire Puncture Sealing Agent

The method of producing the tire puncture sealing agent of the present invention is not particularly limited, and examples thereof include a method that mixes the components described above using an agitator. Note that, when the tire puncture sealing agent of the present invention is produced by the method described above, the production method described above is highly efficient since the foam generated by the mixing disappears in a short period of time.

EXAMPLES

Hereinafter, the present invention will be further described in detail using examples; however, the present invention is not limited thereto.

Production of Tire Puncture Sealing Agent

Tire puncture sealing agents (tire puncture sealing agents of the working examples and the comparative examples) were produced by mixing the components shown in Table 1 below at the proportions (part by mass) listed in the same table using an agitator. Note that, in Table 1, numerical values written in parentheses for the rubber latex and the resin emulsion indicate numbers of part by mass of the solid contents.

Ross Miles Test

The Ross Miles test was performed on the obtained tire puncture sealing agents (only for Working Examples 1-1 to 1-8 and Comparative Examples 1-1 to 1-5). Specifically, for the obtained tire puncture sealing agent, "height of the foam immediately after all the solution was introduced" (initial foam height) and "height of the foam 5 minutes after all the solution was introduced" (foam height after 5 minutes) were measured in accordance with JIS K3362:2008. The results are shown in Table 1.

Sealing properties

For the obtained tire puncture sealing agent, sealing properties were evaluated as described below.

A puncture hole (diameter: 4 mm) was made in the shoulder groove portion of the tread of a tire.

Next, the punctured tire was mounted on a drum tester, 300 mL of the obtained tire puncture sealing agent was injected via the tire valve and the tire was then filled with air until the pressure inside the tire reached 150 kPa. Note that the amount of 300 mL is approximately ⅔ of the liquid amount that is conventionally used.

The tire was then subjected to intermittent driving, in which the above described tire was driven for 1 minute at a speed of 30 km/h under a load of 350 kg and then stopped. The intermittent driving was repeatedly carried out until there was no air permeation observed (until sealing was completed). The presence or absence of the air permeation was determined by visual inspection or by spraying soap water in the vicinity of the puncture hole.

The sealing properties were evaluated based on the criteria described below. The results are shown in Table 1. From the perspective of sealability, A or B is preferable, and A is more preferable.

A: Sealing was completed in 5 cycles or less of the intermittent driving
  B: Sealing was completed after 6 to 10 cycles of the intermittent driving
  C: Sealing was completed after 11 cycles or more of the intermittent driving Freeze Resistance For the obtained tire puncture sealing agent, freeze resistance was evaluated based on the criteria described below. The results are shown in Table 1. From the perspective of freeze resistance, A is preferable.

A: did not freeze at −40° C.
  B: froze at −40° C.

Production Efficiency

In the production of the tire puncture sealing agent described above (only for Working Examples 2-1 to 2-8 and Comparative Examples 2-1 to 2-5), time required for the foam generated by mixing to disappear was measured. Thereafter, the production efficiency was evaluated based on the criteria described below. The results are shown in Table 1. From the perspective of production efficiency, A or B is preferable, and A is more preferable.

A: Less than 5 minutes
  B: 5 minutes or longer but less than 15 minutes
  C: 15 minutes or longer but less than 30 minutes
  D: Longer than 30 minutes

TABLE 1

| Table 1-1 | Comparative Example 1-1 | Comparative Example 1-2 | Comparative Example 1-3 | Comparative Example 1-4 | Comparative Example 1-5 |
|---|---|---|---|---|---|
| Rubber latex | 83 (50) | 83 (50) | 83 (50) | 83 (50) | 83 (50) |
| Resin emulsion | 100 (50) | 100 (50) | 100 (50) | 100 (50) | 100 (50) |
| Propylene glycol | | 100 | 100 | | |
| Ethylene glycol | | | | 100 | |
| 1,3-Propanediol | | | | | 100 |
| Methyl triglycol | | | | | |
| Methyl diglycol | | | | | |
| Surfactant 1 | | | 5 | 5 | 5 |
| Surfactant 2 | | | | | |
| Initial foam height [mm] | 165 | 170 | 195 | 190 | 180 |
| Foam height after 5 minutes [mm] | 135 | 145 | 175 | 170 | 160 |
| Sealing properties | C | C | C | C | C |
| Freeze resistance | B | A | A | A | A |

TABLE 2

| Table 1-2 | Working Example 1-1 | Working Example 1-2 | Working Example 1-3 | Working Example 1-4 | Working Example 1-5 |
|---|---|---|---|---|---|
| Rubber latex | 83 (50) | 83 (50) | 83 (50) | 83 (50) | 83 (50) |
| Resin emulsion | 100 (50) | 100 (50) | 100 (50) | 100 (50) | 100 (50) |
| Propylene glycol | | | | | |
| Ethylene glycol | | | | | |
| 1,3-Propanediol | | | | | |
| Methyl triglycol | 100 | 50 | 300 | | 100 |
| Methyl diglycol | | | | 100 | |
| Surfactant 1 | 5 | 5 | 5 | 5 | 1 |
| Surfactant 2 | | | | | |
| Initial foam height [mm] | 265 | 230 | 255 | 225 | 215 |
| Foam height after 5 minutes [mm] | 245 | 215 | 235 | 205 | 200 |
| Sealing properties | A | B | A | B | B |
| Freeze resistance | A | A | A | A | A |

TABLE 3

| Table 1-3 | Working Example 1-6 | Working Example 1-7 | Working Example 1-8 |
|---|---|---|---|
| Rubber latex | 83 (50) | 83 (50) | 83 (50) |
| Resin emulsion | 100 (50) | 100 (50) | 100 (50) |
| Propylene glycol | | | |
| Ethylene glycol | | | |
| 1,3-Propanediol | | | |
| Methyl triglycol | 100 | 100 | 100 |
| Methyl diglycol | | | |
| Surfactant 1 | 10 | 20 | |
| Surfactant 2 | | | 5 |
| Initial foam height [mm] | 295 | 310 | 205 |
| Foam height after 5 minutes [mm] | 275 | 285 | 190 |
| Sealing properties | A | A | B |
| Freeze resistance | A | A | A |

TABLE 4

| Table 1-4 | Comparative Example 2-1 | Comparative Example 2-2 | Comparative Example 2-3 | Comparative Example 2-4 | Comparative Example 2-5 |
|---|---|---|---|---|---|
| Rubber latex | 83 (50) | 83 (50) | 83 (50) | 83 (50) | 83 (50) |
| Resin emulsion | 100 (50) | 100 (50) | 100 (50) | 100 (50) | 100 (50) |
| Propylene glycol | | 100 | 100 | | |
| Ethylene glycol | | | | 100 | |
| 1,3-Propanediol | | | | | 100 |
| Butyl triglycol | | | | | |
| Dibutyl diglycol | | | | | |
| Surfactant 1 | | | 3 | 3 | 3 |
| Surfactant 2 | | | | | |
| Sealing properties | C | C | C | C | C |
| Freeze resistance | B | A | A | A | A |
| Production efficiency | C | C | D | D | D |

TABLE 5

| Table 1-5 | Working Example 2-1 | Working Example 2-2 | Working Example 2-3 | Working Example 2-4 |
|---|---|---|---|---|
| Rubber latex | 83 (50) | 83 (50) | 83 (50) | 83 (50) |
| Resin emulsion | 100 (50) | 100 (50) | 100 (50) | 100 (50) |
| Propylene glycol | | | | |
| Ethylene glycol | | | | |
| 1,3-Propanediol | | | | |
| Butyl triglycol | 100 | 50 | 300 | |
| Dibutyl diglycol | | | | 100 |
| Surfactant 1 | 3 | 3 | 3 | 3 |
| Surfactant 2 | | | | |
| Sealing properties | A | B | A | B |
| Freeze resistance | A | A | A | A |
| Production efficiency | A | A | B | B |

TABLE 6

| Table 1-6 | Working Example 2-5 | Working Example 2-6 | Working Example 2-7 | Working Example 2-8 |
|---|---|---|---|---|
| Rubber latex | 83 (50) | 83 (50) | 83 (50) | 83 (50) |
| Resin emulsion | 100 (50) | 100 (50) | 100 (50) | 100 (50) |
| Propylene glycol | | | | |
| Ethylene glycol | | | | |
| 1,3-Propanediol | | | | |
| Butyl triglycol | 100 | 100 | 100 | 100 |
| Dibutyl diglycol | | | | |
| Surfactant 1 | 1 | 10 | 20 | |
| Surfactant 2 | | | | 3 |
| Sealing properties | B | A | A | B |
| Freeze resistance | A | A | A | A |
| Production efficiency | A | B | B | B |

The details of each component listed in Table 1 are as follows.

Rubber latex: natural rubber latex (Hytex HA, manufactured by Fulflex and available from Nomura Trading Co., Ltd.; solid content: 60 mass %)

Resin emulsion: ethylene-vinyl acetate-vinyl versatate copolymer emulsion (Sumikaflex 950HQ, manufactured by Sumika Chemtex Co., Ltd.; solid content: 50 mass %)

Propylene glycol: propylene glycol

Ethylene glycol: ethylene glycol 1,3-Propanediol: 1,3-propanediol

Methyl triglycol: methyl triglycol (glycol ether represented by Formula (1) above; $R_{11}$: hydrogen atom; $R_{12}$: methyl group; p=3)

Methyl diglycol: methyl diglycol (glycol ether represented by Formula (1) above; $R_{11}$: hydrogen atom; $R_{12}$: methyl group; p=2)

Butyl triglycol: butyl triglycol (glycol ether represented by Formula (1) above; $R_{11}$: hydrogen atom; $R_{12}$: n-butyl group; p=3)

Dibutyl diglycol: dibutyl diglycol (glycol ether represented by Formula (1) above; $R_{11}$: n-butyl group; $R_{12}$: n-butyl group; p=2)

Surfactant 1: triethanolamine lauryl sulfate (Emal TD, manufactured by Kao Corporation; molecular weight: 405) (compound represented by Formula (2) above; $R_2$: lauryl group (n-dodecyl group); $M^+$: cation represented by Formula (4) above ($R_{41}$: hydrogen atom; $R_{42}$ to $R_{44}$: —$CH_2CH_2OH$))

Surfactant 2: ammonium lauryl sulfate (Latemul AD-25, manufactured by Kao Corporation)

As is clear from Table 1, all of the working examples of the present application, in which the rubber latex and/or the resin emulsion, the glycol ether represented by Formula (1) above, and the surfactant were contained, exhibited excellent freeze resistance, and excellent sealing properties even when the tire puncture sealing agent was used in a small liquid amount.

From the comparison of Working Examples 1-1 and 1-4 and comparison of Working Examples 2-1 and 2-4, Working Examples 1-1 and 2-1, in which p in Formula (1) above was an integer of 3 or greater, exhibited even better sealing properties.

Furthermore, from the comparison of Working Examples 1-1 to 1-3 and comparison of Working Examples 2-1 to 2-3, Working Examples 1-1 and 1-3 as well as 2-1 and 2-3, in which the content of the glycol ether was from 70 to 300 parts by mass per 100 parts by mass total of the solid content of the rubber latex and the solid content of the resin emulsion, exhibited even better sealing properties.

Furthermore, from the comparison of Working Examples 1-1 and 1-8 and comparison of Working Examples 2-1 and 2-8, Working Examples 1-1 and 2-1, in which the surfactant was the compound represented by Formula (2) above, $M^+$ in Formula (2) was the cation represented by Formula (4) above, and at least one of $R_{41}$ to $R_{44}$ in Formula (4) above was an alkyl group having a hydroxy group, exhibited even better sealing properties.

Furthermore, from the comparison of Working Examples 1-1 and 1-5 to 1-7 and comparison of Working Examples 2-1 and 2-5 to 2-7, Working Examples 1-1, 1-6, and 1-7 as well as Working Examples 2-1, 2-6, and 2-7, in which the content of the surfactant was from 3 to 20 parts by mass per 100 parts by mass total of the solid content of the rubber latex and the solid content of the resin emulsion, exhibited even better sealing properties.

On the other hand, Comparative Examples 1-1 to 1-5 and 2-1 to 2-5, in which no glycol ether represented by Formula (1) above was contained, exhibited insufficient sealing properties when the tire puncture sealing agent was used in a small liquid amount.

The invention claimed is:

1. A tire puncture sealing agent comprising: at least one selected from the group consisting of a rubber latex and a resin emulsion; a glycol ether represented by Formula (1); and a surfactant,
   wherein a content of the glycol ether is from 70 to 300 parts by mass per 100 parts by mass total of a solid content of the rubber latex and a solid content of the resin emulsion,

[Chemical Formula 1]

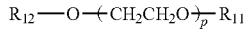
(1)

wherein, $R_{11}$ represents a hydrogen atom or an alkyl group; $R_{12}$ represents an alkyl group; and p represents an integer of 1 or greater.

2. The tire puncture sealing agent according to claim 1, wherein the surfactant is a sulfate ester salt.

3. The tire puncture sealing agent according to claim 1, wherein a content of the surfactant is from 3 to 20 parts by mass per 100 parts by mass total of a solid content of the rubber latex and a solid content of the resin emulsion.

4. The tire puncture sealing agent according to claim 1, wherein p in Formula (1) is an integer of 3 or greater.

5. The tire puncture sealing agent according to claim 2, wherein a content of the surfactant is from 3 to 20 parts by mass per 100 parts by mass total of a solid content of the rubber latex and a solid content of the resin emulsion.

6. The tire puncture sealing agent according to claim 2, wherein p in Formula (1) is an integer of 3 or greater.

7. The tire puncture sealing agent according to claim 3, wherein p in Formula (1) is an integer of 3 or greater.

8. The tire puncture sealing agent according to claim 5, wherein p in Formula (1) is an integer of 3 or greater.

* * * * *